United States Patent
McCormick et al.

(10) Patent No.: US 9,190,822 B2
(45) Date of Patent: Nov. 17, 2015

(54) ELECTRICAL CORD ATTACHMENT ASSEMBLY FOR A HAND MIXER

(75) Inventors: Arren J. McCormick, Benton Harbor, MI (US); Anthony S. Roberts, Granger, IN (US); Timothy Patrick VanAntwerp, St. Joseph, MI (US); Jeremy T. Wolters, Stevensville, MI (US); John A. Colasanti, Jenison, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 369 days.

(21) Appl. No.: 13/354,480

(22) Filed: Jan. 20, 2012

(65) Prior Publication Data

US 2013/0188439 A1    Jul. 25, 2013

(51) Int. Cl.
H02G 11/00 (2006.01)
H02G 3/22 (2006.01)
A47J 43/044 (2006.01)
A47J 43/07 (2006.01)

(52) U.S. Cl.
CPC ....... *H02G 11/00* (2013.01); *A47J 2043/04418* (2013.01); *A47J 2043/0744* (2013.01); *H02G 3/22* (2013.01)

(58) Field of Classification Search
CPC ... A47J 43/0705; A47J 43/082; A47J 43/044; A47J 43/0711; B01F 2215/005; H02G 11/00
USPC .............. 366/129; 439/446; 310/50, 71
See application file for complete search history.

(56) References Cited

U.S. PATENT DOCUMENTS

| | | | |
|---|---|---|---|
| 2,225,031 A | 12/1940 | Caldwell | |
| 4,078,849 A | 3/1978 | Fischer | |
| 4,106,165 A * | 8/1978 | Clowers et al. | 24/134 R |
| 4,357,519 A | 11/1982 | Bain, Jr. | |
| 5,366,187 A * | 11/1994 | Ishihara | 248/52 |
| 5,522,659 A * | 6/1996 | Penaranda et al. | 366/129 |
| 6,669,359 B1 | 12/2003 | Ancona et al. | |
| 7,621,767 B2 | 11/2009 | Stagi et al. | |
| 2009/0091199 A1 | 4/2009 | Lee | |
| 2011/0162986 A1* | 7/2011 | Garman et al. | 206/320 |
| 2012/0205958 A1* | 8/2012 | Colasanti et al. | 297/411.36 |

FOREIGN PATENT DOCUMENTS

DE    3844536 A1    11/1989
DE    4232951 A1    4/1994

OTHER PUBLICATIONS

European Patent Application No. 13151706.2, filed Jan. 17, 2013, Applicant: Whirlpool Corporation, Extended European Search Report dated May 23, 2013.

* cited by examiner

*Primary Examiner* — David Sorkin
*Assistant Examiner* — Abbas Rashid

(57) ABSTRACT

A hand mixer includes an outer casing and a mixing element coupled to an electric motor. The hand mixer includes a cord guide that is configured to pivot about a pivot axis, an electrical cord extending through the cord guide, and a retaining clip that engages the cord guide to couple the cord guide to the outer casing. The hand mixer also includes a locking mechanism operable to retain the cord guide in a first position about the pivot axis.

17 Claims, 8 Drawing Sheets

ELECTRICAL CORD ATTACHMENT ASSEMBLY FOR A HAND MIXER

TECHNICAL FIELD

The present disclosure relates generally to a hand mixer and more particularly to a cord attachment assembly for a hand mixer.

BACKGROUND

A portable appliance, or small appliance, such as a hand mixer, is a device that may be used in the preparation of meals and other foodstuffs. Typically, a hand mixer includes a mixing element and a handle that may be grasped by a user to manipulate the hand mixer. Illustrative examples of a mixing element include a mixing beater and a wire whip. Many hand mixers include electrically-operated components, such as a motor and other electronics, that drive the mixing element. An electrically-operated hand mixer may include an electrical cable or cord that connects the motor to an external power supply.

SUMMARY

According to one aspect of the disclosure, a hand mixer includes an outer casing having a handle secured thereto, a mixing element extending downwardly from the outer casing that is rotatively coupled to a motor positioned in the outer casing. The hand mixer also includes a cord guide that is positioned in an opening defined in the outer casing and is configured to pivot about a pivot axis. The hand mixer includes a retaining clip that has a pair of arms positioned in a slot defined in the cord guide to couple the cord guide to the outer casing. An electrical cord extends through the cord guide and is in electrical communication with the motor to supply electrical current thereto. The hand mixer also includes a locking mechanism operable to retain the cord guide in a first position about the pivot axis. The locking mechanism includes a tab extending from the cord guide, and a notch defined in one of the retaining clip and the outer casing, the notch being sized to receive the tab.

In some embodiments, the outer casing may include a bottom wall having the opening defined therein and the opening may be a first opening. The outer casing may also include a platform extending upwardly from the bottom wall that has a second opening defined in an upper end thereof and an inner wall extending downwardly from the second opening to the first opening to define a passageway through the platform. The cord guide may include a sleeve positioned external to the outer casing, and a guide body extending upwardly from the sleeve into the passageway.

In some embodiments, the cord guide may include a guideway having the electrical cord extending therethrough. The guideway may have a first section extending through the guide body and a second section extending through the sleeve. The first section may define a first axis, and the second section may define a second axis. An angle may be defined between the first axis and the second axis. The angle may have a magnitude of greater than or equal to ninety degrees.

In some embodiments, the pivot axis may extend through the passageway between the first opening and the second opening. The platform may include a cylindrical shell having a first channel and a second channel defined therein. The first channel and the second channel may extend orthogonal to the pivot axis. The pair of arms of the retaining clip may include a first arm positioned in the first channel and a second arm positioned in the second channel.

In some embodiments, the guide body may include a cylindrical surface and a pair of rim surfaces that extend outwardly from the cylindrical surface to define the slot of the cord guide. The tab of the locking mechanism may extend outwardly from the cylindrical surface between the pair of rim surfaces. The first arm of the retaining clip may include an inner surface having a first surface section shaped to match the cylindrical surface of the guide body and a second surface section that may define the notch of the locking mechanism.

In some embodiments, the tab may have a convex outer surface, and the second surface section of the first arm may be a concave surface that is shaped to receive the convex outer surface of the tab.

In some embodiments, the second arm of the retaining clip may include an inner surface having a first surface section shaped to match the cylindrical surface of the guide body and a second surface section. The locking mechanism may include a second notch defined by the second surface section of the second arm. The second notch may be sized to receive the tab to retain the cord guide in a second position about the pivot axis.

Additionally, in some embodiments, a pair of inner walls may extend upwardly from the upper end of the platform, and the notch of the locking mechanism may be defined between the pair of inner walls. In some embodiments, the guide body may include a cylindrical outer surface having the tab extending radially outward therefrom. The slot may be defined in the cylindrical outer surface below the tab.

In some embodiments, the locking mechanism may include a second tab extending radially outward from the cylindrical outer surface of the guide body. The second tab may be sized to be received in the notch to retain the cord guide in a second position about the pivot axis. In some embodiments, the guide body may include an upper surface, and the tab may extend upwardly from the upper surface. The notch may be defined in a downward-facing surface of one of the retaining clip and the outer casing.

In some embodiments, the retaining clip may include a third arm having an end positioned above the pair of arms. The end of the third arm may have the notch defined therein. Additionally, in some embodiments, the locking mechanism may include a second tab extending upwardly from the upper surface of the guide body. The second tab may be sized to be received in the notch to retain the cord guide in a second position about the pivot axis.

According to another aspect of the disclosure, the hand mixer includes an outer casing having a handle secured thereto, a mixing element that extends downwardly from the outer casing and is rotatively coupled to a motor positioned in the outer casing, a cord guide positioned in an opening defined in the outer casing that is configured to pivot about a pivot axis, and a retaining clip that is engaged with the cord guide to couple the cord guide to the outer casing. An electrical cord extends through the cord guide, and the electrical cord is in electrical communication with the motor to supply electrical current thereto. The cord guide includes a body having a tab extending therefrom, and the retaining clip includes an arm having a notch defined therein, the notch being sized to receive the tab to retain the cord guide in a first position about the pivot axis.

In some embodiments, the body of the cord guide may have a slot defined therein, the arm of the retaining clip may be a first arm positioned in the slot, and the retaining clip may include a second arm extending substantially parallel to the first arm. The second arm may be positioned in the slot opposite the first arm. Additionally, in some embodiments, the second arm may have a second notch defined therein. The second notch may be sized to receive the tab of the cord guide to retain the cord guide in a second position about the pivot axis.

In some embodiments, the body of the cord guide may have an upper surface, the tab may extend upwardly from the upper surface, and the notch may be defined in a lower surface of the arm of the retaining clip. In some embodiments, the body of the cord guide may include a second tab extending upwardly from the upper surface. The second tab may be sized to be received in the notch to retain the cord guide in a second position about the pivot axis.

According to another aspect, the hand mixer includes an outer casing having a handle secured thereto and a mixing element that extends downwardly from the outer casing and is rotatively coupled to a motor positioned in the outer casing. The hand mixer also includes a cord guide positioned in an opening defined in the outer casing, and the cord guide is configured to pivot about a pivot axis. The hand mixer includes a retaining clip that has a pair of arms positioned in a slot of the cord guide to couple the cord guide to the outer casing. An electrical cord extends through the cord guide and is in electrical communication with the motor to supply electrical current thereto. The cord guide includes a cylindrical body having a tab extending radially outward therefrom, and the outer casing has a notch defined therein sized to receive the tab to retain the cord guide in a first position about the pivot axis.

In some embodiments, the cylindrical body may have a second tab extending radially outward therefrom. The second tab may be sized to be received in the notch to retain the cord guide in a second position about the pivot axis.

BRIEF DESCRIPTION OF THE DRAWINGS

The detailed description particularly refers to the following figures, in which.

DETAILED DESCRIPTION OF THE DRAWINGS

Figure 1:
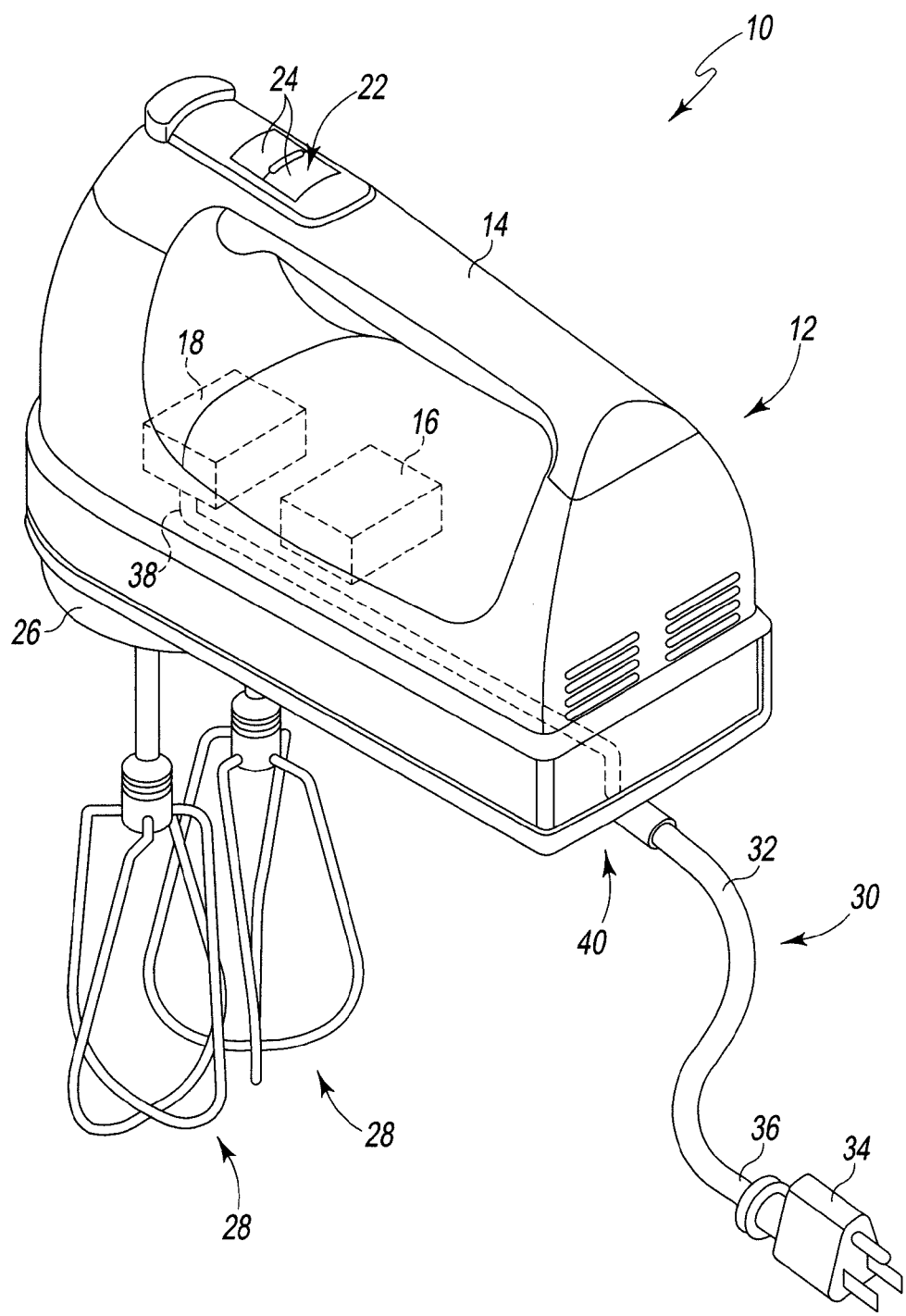
FIG. 1 is a rear perspective view of a hand mixer including one embodiment of a cord attachment assembly.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a portable appliance is shown as a hand mixer 10. The hand mixer 10 includes an outer casing 12 and a handle 14 secured to the outer casing 12. The outer casing 12 encases a motor 16 and associated electronic motor controls 18, which are positioned in a compartment 20 (see FIG. 2) defined in the outer casing 12. The hand mixer 10 also includes user controls 22 to control the operation of the motor 16. In the illustrative embodiment, the controls 22 include a number of push buttons 24, which may be operated to activate the motor 16 and/or select a desired speed setting for the motor 16. It will be appreciated that in other embodiments the user controls 22 may be any type of analog or digital user interface operable to input a desired speed setting for the hand mixer 10.

The outer casing 12 of the hand mixer 10 includes a mounting platform 26, and the hand mixer 10 includes a pair of mixing elements 28 that may be releasably attached to the mounting platform 26. In the illustrative embodiment, the mixing elements 28 are embodied as a pair of mixing beaters that extend downwardly from the outer casing 12. Other possible mixing elements 28 include dough hooks, blender rods, whisks, and the like. The motor 16 provides motive power to rotate the mixing elements 28 to mix foodstuffs and other items. It should be appreciated that the motor 16 may be directly secured to the mixing elements 28 or indirectly via a transmission or gear system.

The hand mixer 10 also includes an electrical cord 30 that is configured to connect the motor 16 to an electrical power supply. The electrical cord 30 includes a cable 32 and an electrical plug 34 that is attached at an end 36 of the cable 32. The plug 34 is configured to fit in a standard electrical outlet (not shown) of a home or other building. The other end 38 of the cable 32 is electrically-coupled to the motor 16 within the compartment 20. The electrical cord 30 is pivotally coupled to the outer casing 12 via a cord attachment assembly 40, as described in greater detail below.

Figure 2:
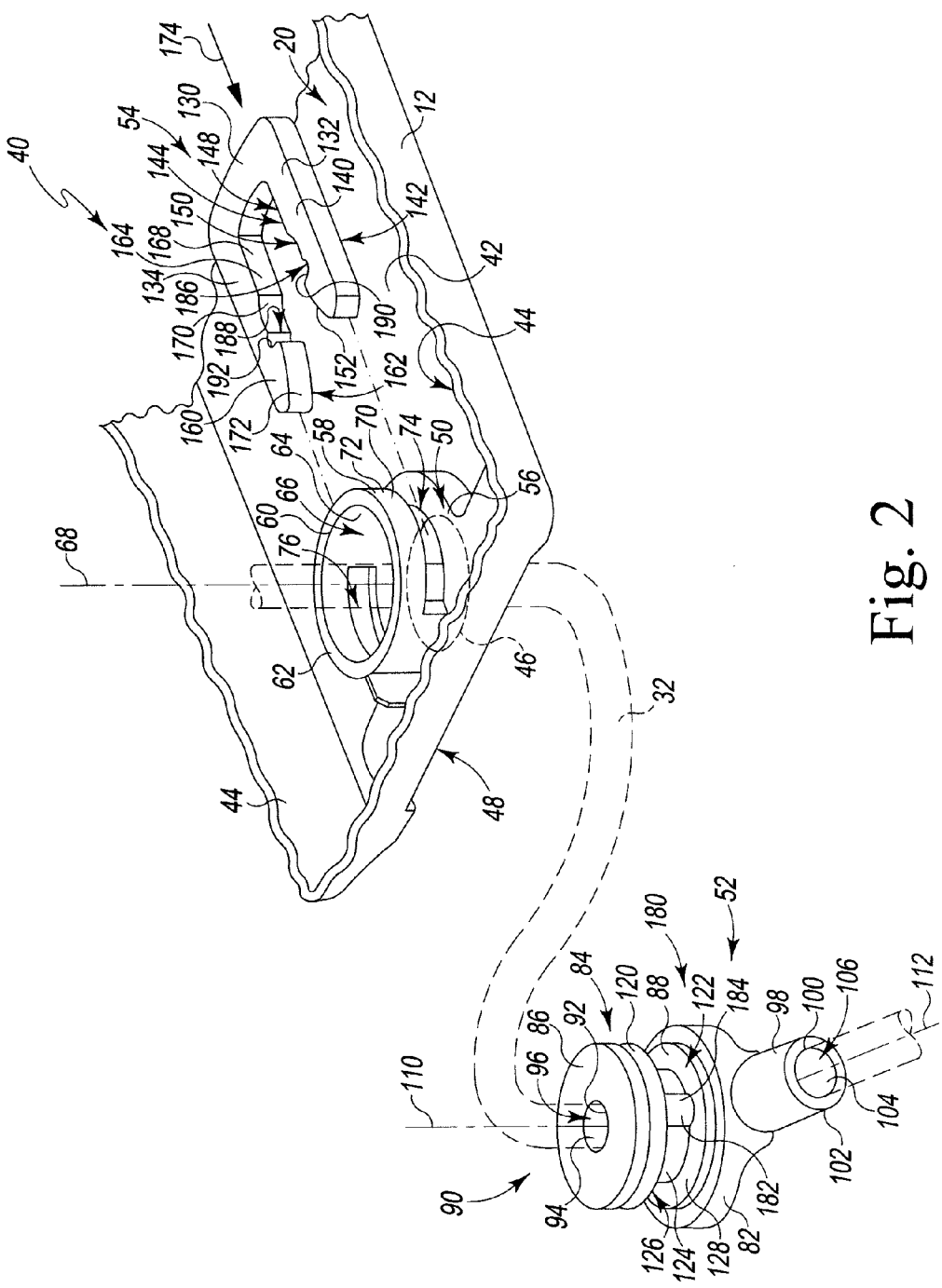
FIG. 2 is an exploded perspective view the cord attachment assembly of FIG. 1.

Referring now to FIG. 2, the outer casing 12 of the hand mixer 10 includes a bottom wall 42 and a number of side walls 44 that extend upwardly from the bottom wall 42. The bottom wall 42 and the side walls 44 cooperate to define the compartment 20 in the outer casing 12. An opening 46 is defined in bottom wall 42 at the back end of the outer casing 12. In the illustrative embodiment, the opening 46 is circular and extends from a bottom surface 48 of the casing 12 into the compartment 20.

The cord attachment assembly 40 of the hand mixer 10 includes a platform 50 integrally formed with the bottom wall 42 of the casing 12, a cord guide 52 that receives a portion of the electrical cord 30, and a retaining clip 54 that secures the cord guide 52 to the platform 50. The platform 50 of the attachment assembly 40 includes a base 56 extending upwardly from the bottom wall 42 and a shell 58 extending upwardly from the base 56. An opening 60 is defined in an upper end 62 of the shell 58 of the platform 50, and an inner wall 64 extends downwardly from the opening 60 to define a cylindrical passageway 66 through the platform 50. As shown in FIG. 2, the passageway 66 defines a pivot axis 68 of the cord attachment assembly 40 that extends through the openings 46, 60.

The shell 58 includes an outer wall 70 that has a cylindrical outer surface 72. It should be appreciated that in other embodiments the shell 58 may include one or more substantially planar surfaces. The shell 58 includes a pair of channels 74, 76 that are defined in the outer surface 72. The channels 74, 76 extend from the outer wall 70 to the inner wall 64 of the shell 58. As shown in FIG. 2, the channels 74, 76 extend orthogonally to the axis 68 defined through the platform 50 and are sized to receive the retaining clip 54, as described in greater detail below.

As shown in FIG. 2, the cord guide 52 of the cord attachment assembly 40 has a portion of the cord 30 extending therethrough. The cord guide 52 includes an outer hub 82 that is positioned outside of the compartment 20 and a guide body 84 that extends upwardly from the outer hub 82 into the passageway 66 of the platform 50. The guide body 84 includes a frame 86 and a ring 88 secured to the frame 86. In the illustrative embodiment, the frame 86 and the outer hub 82 are formed as a single monolithic component from a hard plastic material, such as, for example, polyvinyl chloride ("PVC"), and the ring 88 is formed from nylon. It should be appreciated that in other embodiments the outer hub 82, the frame 86, and the ring 88 may be formed as a single monolithic component from the same material. It should also be appreciated that the hub 82, the frame 86, and the ring 88 may each be formed separately and later assembled into the cord guide 52.

To form the cord guide 52, the electrical cord 30 and the ring 88 are positioned in an injection mold. The PVC material is injected into the mold around the cord 30 and the ring 88. The PVC material is allowed to cool, thereby forming the outer hub 82 and the frame 86 of the cord guide 52 around the cord 30 and the ring 88. The cord guide 52 may then be removed from the mold.

After the cord guide 52 is formed around the cable 32 of the electrical cord 30, the cable 32 extends through a guideway 90 of the cord guide 52. The frame 86 of the guide body 84 has an opening 92 defined in an upper end thereof, and an inner wall 94 extends downwardly from the opening 92 to define a section 96 of the guideway 90. The outer hub 82 of the cord guide 52 has a sleeve 98 that extends outwardly therefrom, and an opening 100 is defined in an end 102 of the sleeve 98. Another inner wall 104 extends inwardly from the end 102 to define another section 106 of the guideway 90. The sections 96, 106 of the guideway 90 intersect within the outer hub 82 of the cord guide 52.

As shown in FIG. 2, the section 96 of the guideway 90 extends along an axis 110, and the other section 106 of the guideway 90 extends along another axis 112. In the illustrative embodiment, an angle having a magnitude that is greater than or equal to 90 degrees and less than 180 degrees is defined between the axes 110, 112. As a result, the cord guide 52 directs the cable 32 into at least a ninety-degree turn and provides strain relief for the cable 32.

In the illustrative embodiment, the guide body 84 of the cord guide 52 is positioned in the passageway 66 of the platform 50 when the hand mixer 10 is assembled. As described above, the guide body 84 includes a ring 88 that is secured to the frame 86, and the ring 88 has a cylindrical outer surface 120. A slot 122 is defined in the ring 88 by a cylindrical inner surface 124 and a pair of side walls 126, 128 that extend from the inner surface 124 to the outer surface 120. When the guide body 84 is properly positioned in the passageway 66, the slot 122 is aligned with the channels 74, 76 defined in the shell 58 of the platform 50.

Figure 3:
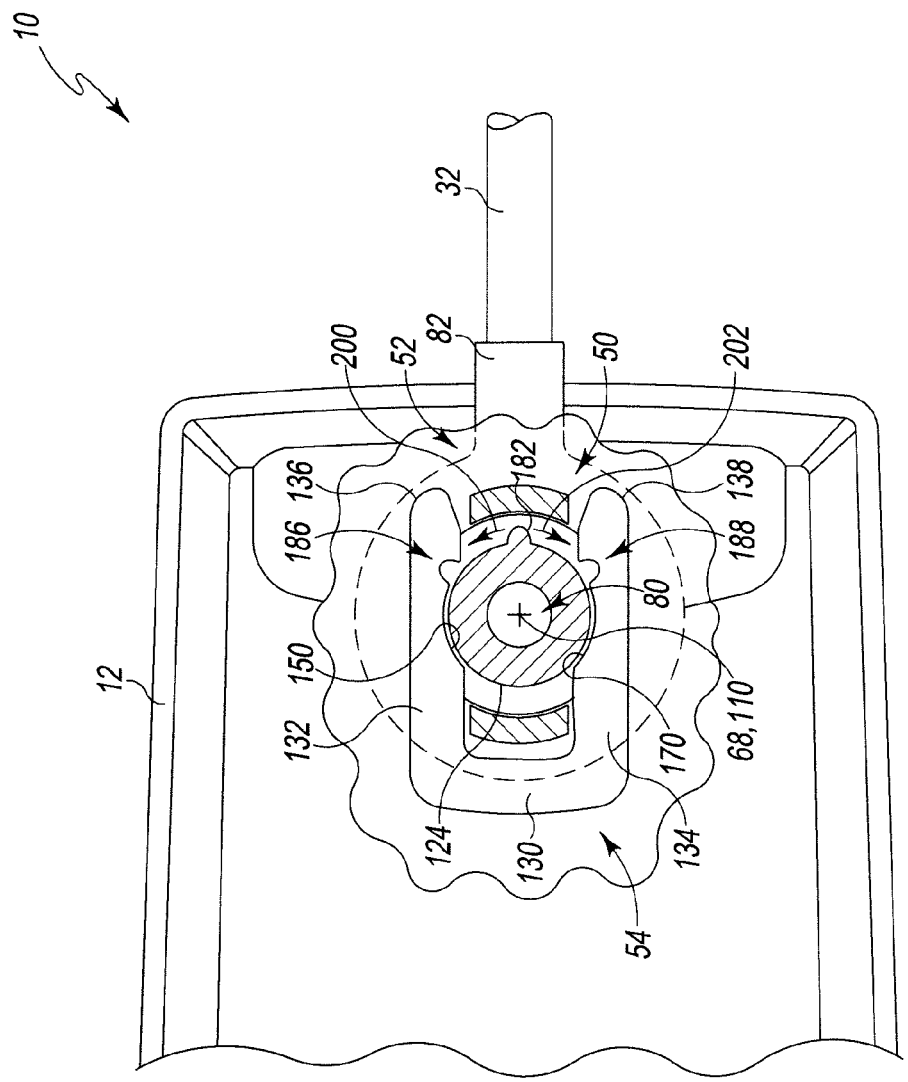
FIG. 3 is a fragmentary bottom plan view of the hand mixer of FIG. 1 showing the cord attachment assembly in an unlocked position.

As shown in FIG. 3, the axis 110 of the section 96 of the guideway 80 is aligned with the axis 68 that extends through the openings 46, 60 of the platform 50. The cord guide 52 is configured to swivel or pivot about the axes 68, 110 relative to the casing 12. In that way, the cord guide 52 (and hence the cord 30) may be repositioned to move the cord 30 to a more convenient position and thereby facilitate the mixing operation.

As described above, the cord attachment assembly 40 also includes a retaining clip 54 that secures the cord guide 52 to the platform 50. In the illustrative embodiment, the retaining clip 54 is formed from an acetal plastic material. It should be appreciated that in other embodiments the retaining clip 54 may be formed from another resilient polymeric or metallic material. The retaining clip 54 of the attachment assembly 40 includes a support beam 130 and a pair of arms 132, 134 that extend outwardly from the support beam 130 to ends 136, 138, respectively.

As shown in FIG. 2, the arm 132 of the retaining clip 54 has an upper surface 140, a lower surface 142, and an inner surface 144 extending between the surfaces 140, 142. The inner surface 144 of the arm 132 includes a substantially planar surface section 148 that extends from the support beam 130 and a concave surface section 150 that is shaped to conform to the cylindrical inner surface 124 of the ring 88 of the cord guide 52. The surface 140 also includes an angled surface section 152 that extends inwardly from the end 136 of the arm 132.

The arm 134 of the retaining clip 54 has a configuration substantially similar to the arm 132. The arm 134 has an upper surface 160, a lower surface 162, and an inner surface 164 extending between the surfaces 160, 162. The inner surface 164 of the arm 134 also includes a substantially planar surface section 168 that extends from the support beam 130 opposite the surface section 148 of the arm 132. The inner surface 164 also includes a concave surface section 170 that is shaped to conform to the cylindrical inner surface 124 of the ring 88 of the cord guide 52 and an angled surface section 172 that extends inwardly from the end 138 of the arm 134.

To secure the cord guide 52 to the platform 50 (and hence the outer casing 12), the guide body 84 is positioned in the passageway 66 such that the slot 122 is aligned with the channels 74, 76 defined in the shell 58 of the platform 50. The retaining clip 54 is advanced in the direction indicated by arrow 174 in FIG. 2 into the channels 74, 76. The angled surface sections 152, 172 of the arms 132, 134, respectively, are advanced into contact with the guide body 84 and engage the cylindrical inner surface 124 of the guide body 84. When the retaining clip 54 is advanced further in the direction indicated by arrow 174, the arms 132, 134 are pushed outward as the surface sections 152, 172 slide along the inner surface 124. When the surface sections 152, 172 of the arms 132, 134 move beyond the outer most portion of the cylindrical inner surface 124, the arms 132, 134 return to their original shape, and the concave surface sections 150, 170 are moved into contact with the cylindrical inner surface 124 of the guide body 84.

When the retaining clip 54 is engaged with the cord guide 52 and the platform 50, the upper surface 140 and the lower surface 142 of the arm 132 engages the side walls 126, 128 of the cord guide 52 and the platform 50 on one side thereof. Similarly, the upper surface 160 and the lower surface 162 of the arm 134 engages the side walls 126, 128 of the cord guide 52 and the platform 50 on the opposite side thereof. The engagement between those surfaces secures the cord guide 52 to the casing 12 and prevents the cord guide 52 from moving vertically along the axes 68, 110. Because the concave surface sections 150, 170 are shaped to conform to the cylindrical inner surface 124, axial rotation of the cord guide 52 is permitted such that the guide 52 may be pivoted about the axes 68, 110.

The cord attachment assembly 40 also includes a locking mechanism 180 operable to lock or retain the cord guide 52 in position about the axes 68, 110. In the illustrative embodiment, the locking mechanism 180 includes a tab 182 positioned in the slot 122 defined in the cord guide 52. The tab 182 extends outwardly from cylindrical inner surface 124 between the side walls 126, 128 of the cord guide 52. As shown in FIG. 2, the tab 182 has a convex outer surface 184.

The locking mechanism 180 also includes a pair of notches 186, 188 defined in the retaining clip 54. As shown in FIG. 2, the arm 132 of the retaining clip 54 includes a concave surface section 190, which is positioned between the surface sections 150, 152 of the inner surface 144, and the surface section 190 defines the notch 186 of the locking mechanism 180. The other notch 188 is defined in the arm 134 by a concave surface section 192 that is positioned between the surface sections 170, 172 of the inner surface 164. Each of the notches 186, 188 are sized to receive the tab 182.

Figure 4:
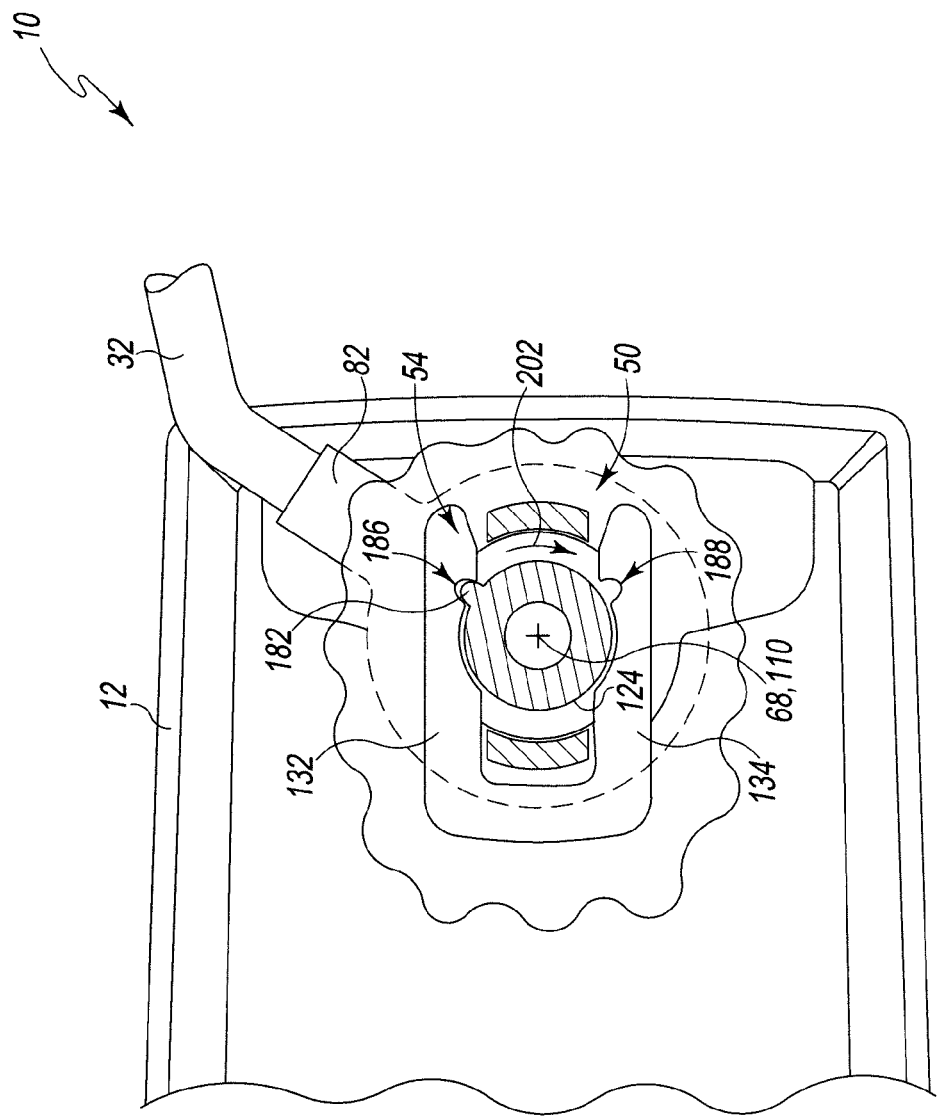
FIG. 4 is a view similar to FIG. 3 showing the cord attachment assembly in a locked position.

Referring now to FIGS. 3 and 4, the cord guide 52 of the hand mixer 10 is shown in an unlocked position (see FIG. 3) and a locked position (see FIG. 4). In the unlocked position shown in FIG. 3, the tab 182 of the locking mechanism 180 is positioned between the arms 132, 134 of the retaining clip 54, and the cord guide 52 is permitted to pivot about the axes 68, 110 in either direction indicated by arrows 200, 202. To lock the cord guide 52 in one of the locked positions, the cord guide 52 may be pivoted in the direction indicated by arrow 200 so that the tab 182 is advanced into contact with the inner surface 144 of the arm 132. When the cord guide 52 is advanced further in the direction indicated by arrow 200, the tab 182 may slide along the inner surface 144 of the arm 132, thereby causing the arm 132 to flex outward and permitting the tab 182 to advance into the notch 188 and placing the cord guide 52 in the locked position shown in FIG. 4.

As shown in FIG. 4, the engagement between the tab 182 and the notch 186 inhibits rotation of the cord guide 52 about the axes 68, 110 such that the cord guide 52 is retained in the locking position. To release the cord guide 52 from the locked position, a predetermined amount of force may be applied to the cord guide 52 in the direction indicated by arrow 202. When the predetermined amount of force is applied, the arm 132 of the retaining clip 54 flexes outward such that the tab 182 may be advanced out of the notch 186 and into the unlocked position shown in FIG. 3.

To lock the cord guide 52 in the other locked position, the cord guide 52 may be rotated in the direction indicated by arrow 202 to advance the tab 182 into contact with the inner surface 164 of the arm 134. When the cord guide 52 is advanced further in the direction indicated by arrow 202, the tab 182 may slide along the inner surface 164 of the arm 134, thereby causing the arm 134 to flex outward and permitting the tab 182 to advance into the notch 188 defined in the arm 134 and placing the cord guide 52 in another locked position. The engagement between the tab 182 and the notch 188 inhibits rotation of the cord guide 52 about the axes 68, 110 such that the cord guide 52 is retained in the locked position.

Referring now to FIGS. 5-8, other embodiments of a cord attachment assembly are illustrated. Some features of the embodiments shown in FIGS. 5-8 are substantially similar to those discussed above in reference to the embodiment of FIGS. 1-4. Such features are designated in FIGS. 5-8 with the same reference numbers as those used in FIGS. 1-4.

Figure 5:
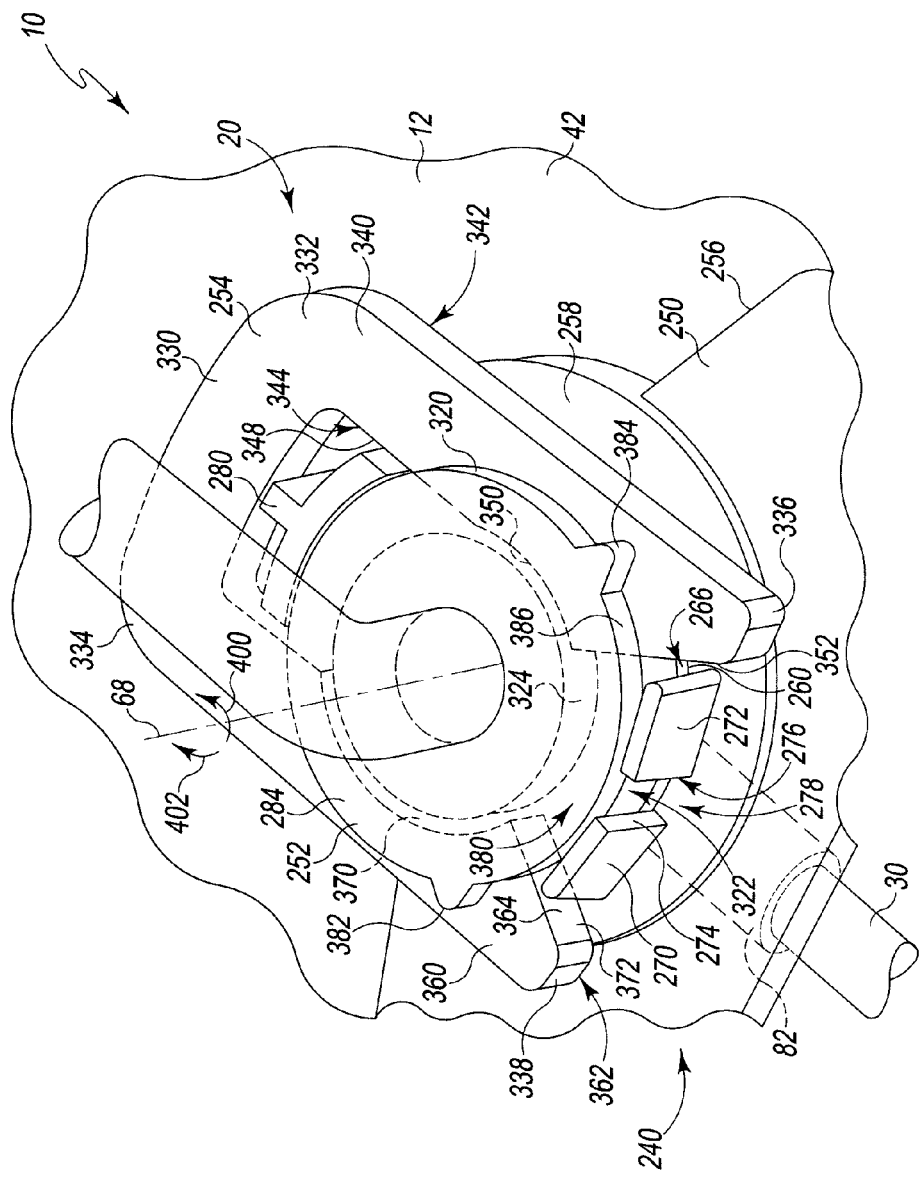
FIG. 5 is a perspective view of another embodiment of a cord attachment assembly for a hand mixer.
Figure 6:
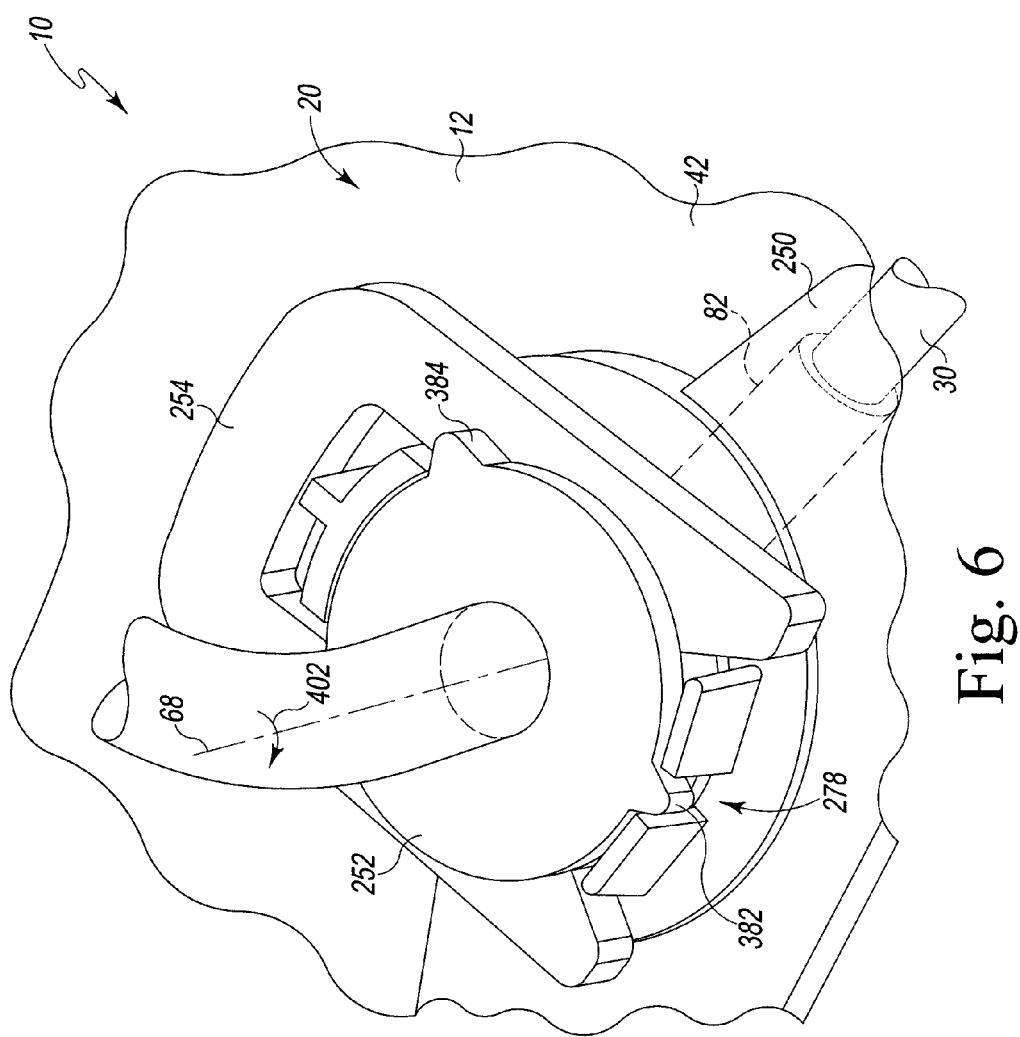
FIG. 6 is a view similar to FIG. 5 showing the cord attachment assembly in a locked position.

Referring now to FIGS. 5 and 6, the hand mixer 10 includes an outer casing 12 and a motor (not shown) positioned in a compartment 20 of the casing 12. The hand mixer 10 also includes an electrical cord 30 that is configured to connect the motor to an electrical power supply. The electrical cord 30 is pivotally coupled to the outer casing 12 via a cord attachment assembly 240, as described in greater detail below.

As shown in FIG. 5, the cord attachment assembly 240 includes a platform 250 integrally formed with a bottom wall 42 of the casing 12, a cord guide 252, and a retaining clip 254 that secures the cord guide 252 to the platform 250. The platform 250 includes a base 256 that extends upwardly from the bottom wall 42 of the casing 12. The base 256 has a substantially planar upper surface 258, and an opening 260 is defined in the upper surface 258. An inner wall (not shown) extends downwardly from the opening 260 to define a cylindrical passageway 266 through the platform 250 and the bottom surface 48 of the casing 12. As shown in FIG. 5, the passageway 266 defines an axis 68.

The platform 250 of the assembly 240 includes a pair of walls 270, 272 that extend upwardly from the upper surface 258. The wall 270 includes an inner surface 274 that faces an inner surface 276 of the wall 272. A notch 278 is defined between the surfaces 274, 276 of the walls 270, 272. The platform 250 also includes another wall 280 that is positioned on the opposite side of the opening 260 from the walls 270, 272.

As shown in FIG. 5, the cord guide 252 of the cord attachment assembly 240 has a portion of the cord 30 extending therethrough. The cord guide 252 includes an outer hub 82 that is positioned outside of the compartment 20 and a guide body 284 that extends upwardly from the outer hub 82 into the passageway 266 of the platform 250. The cord guide 252 is configured to swivel or pivot about the axis 68 relative to the casing 12. In that way, the cord guide 252 (and hence the cord 30) may be repositioned to move the cord 30 to a more convenient position and thereby facilitate the mixing operation.

In the illustrative embodiment, the outer hub 82 and the guide body 284 are formed as a single monolithic component from a hard plastic material, such as, for example, polyvinyl chloride ("PVC"). It should be appreciated that in other embodiments the outer hub 82 and the guide body 284 may be formed as a single monolithic component from the same material. It should also be appreciated that the cord guide 252 may include additional components that are formed separately and later assembled into the cord guide 252.

As shown in FIG. 5, the guide body 284 of the cord guide 252 is positioned in the passageway 266 of the platform 250 when the hand mixer 10 is assembled. The guide body 284 has a cylindrical outer surface 320, and a slot 322 is defined in the guide body 284 by a cylindrical inner surface 324 and a pair of side walls (not shown) that extend from the inner surface 324 to the outer surface 320. When the guide body 284 is properly positioned in the passageway 266, the slot 322 is positioned above the upper surface 258 of the platform 250.

As described above, the cord attachment assembly 240 also includes a retaining clip 254 that secures the cord guide 252 to the platform 250. In the illustrative embodiment, the retaining clip 254 is formed from an acetal plastic material. It should be appreciated that in other embodiments the retaining clip 254 may be formed from another resilient polymeric or metallic material. The retaining clip 254 of the attachment assembly 240 includes a support beam 330 and a pair of arms 332, 334 that extend outwardly from the support beam 330 to ends 336, 338, respectively.

As shown in FIG. 5, the arm 332 of the retaining clip 254 has an upper surface 340, a lower surface 342, and an inner surface 344 extending between the surfaces 340, 342. Like the embodiment of FIGS. 1-4, the inner surface 344 of the arm 332 includes a substantially planar surface section 348 that extends from the support beam 330 and a concave surface section 350 that is shaped to conform to the cylindrical inner surface 324 of the cord guide 252. The surface 340 also includes an angled surface section 352 that extends inwardly from the end 336 of the arm 332.

The arm 334 of the retaining clip 254 has a configuration substantially similar to the arm 332. The arm 334 has an upper surface 360, a lower surface 362, and an inner surface 364 extending between the surfaces 360, 362. The inner surface 364 of the arm 334 also includes a substantially planar surface section (not shown) that extends from the support beam 330 opposite the surface section 348 of the arm 332 and a concave surface section 370 that is shaped to conform to the cylindrical inner surface 324 of the cord guide 252 and an angled surface section 372 that extends inwardly from the end 338 of the arm 334.

The cord attachment assembly 40 also includes a locking mechanism 380 operable to lock or retain the cord guide 252 in position about the axis 68. As shown in FIGS. 5 and 6, the locking mechanism 380 includes a pair of tabs 382, 384 that extend radially outward from the cylindrical outer surface 320 of the cord guide 252 at an upper end 386 thereof. The locking mechanism 380 also includes the notch 278 defined between the surfaces 274, 276 of the walls 270, 272. As shown in FIG. 6, the notch 278 is sized to receive one of the tabs 382, 384 of the cord guide 252.

The cord guide 252, like the cord guide 52 of FIGS. 1-4, is configured to move between an unlocked position (see FIG. 5) and two locked positions (see FIG. 6). In the unlocked position shown in FIG. 5, the tabs 382, 384 of the locking mechanism 380 are positioned outside of the notch 278 defined between the walls 270, 272, and the cord guide 252 is permitted to pivot about the axis 68 in either direction indicated by arrows 400, 402. To lock the cord guide 252 in one of the locked positions, the cord guide 252 may be pivoted in the direction indicated by arrow 400 so that the tab 382 is advanced into contact with the wall 270 of the platform 250. When the cord guide 252 is advanced further in the direction indicated by arrow 400, the tab 382 may slide along the wall 270, thereby causing the wall 270 to flex outward and permitting the tab 382 to advance into the notch 278 defined between the walls 270, 272.

As shown in FIG. 6, the engagement between the tab 382 and the notch 278 inhibits rotation of the cord guide 252 about the axis 68 such that the cord guide 252 is retained in the locked position. To release the cord guide 252 from the locked position, a predetermined amount of force may be applied to the cord guide 252 in the direction indicated by arrow 402. When the predetermined amount of force is applied, the wall 270 of the platform 250 flexes outward such that the tab 382 may be advanced out of the notch 278 and into the unlocked position shown in FIG. 5.

To lock the cord guide 252 in the other locked position, the cord guide 252 may be rotated in the direction indicated by arrow 402 to advance the tab 384 into contact with the other wall 272. When the cord guide 252 is advanced further in the direction indicated by arrow 402, the tab 384 may slide along the wall 272, thereby causing the wall 272 to flex outward and permitting the tab 384 to advance into the notch 278. The engagement between the tab 384 and the notch 278 inhibits rotation of the cord guide 252 about the axis 68 such that the cord guide 252 is retained in the locked position.

Figure 7:
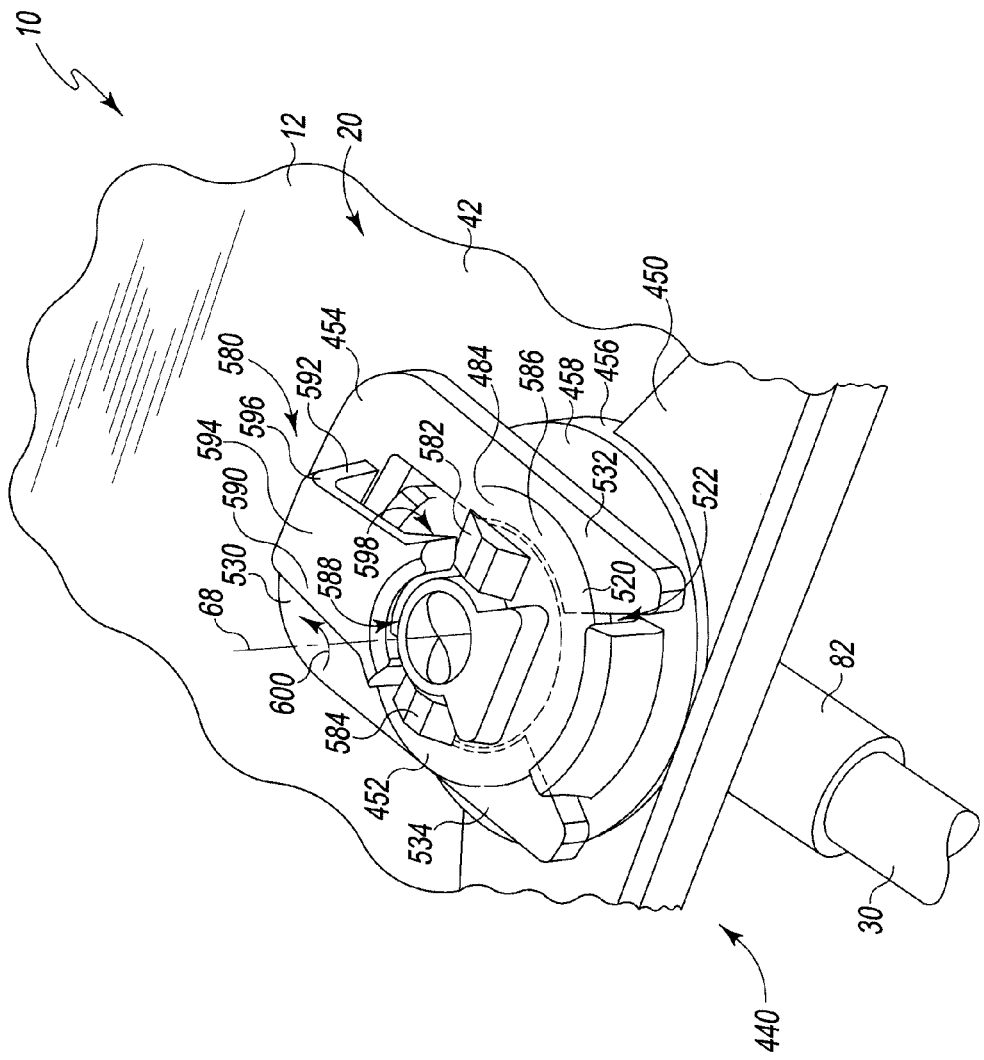
FIG. 7 is a perspective view of another embodiment of a cord attachment assembly for a hand mixer.
Figure 8:
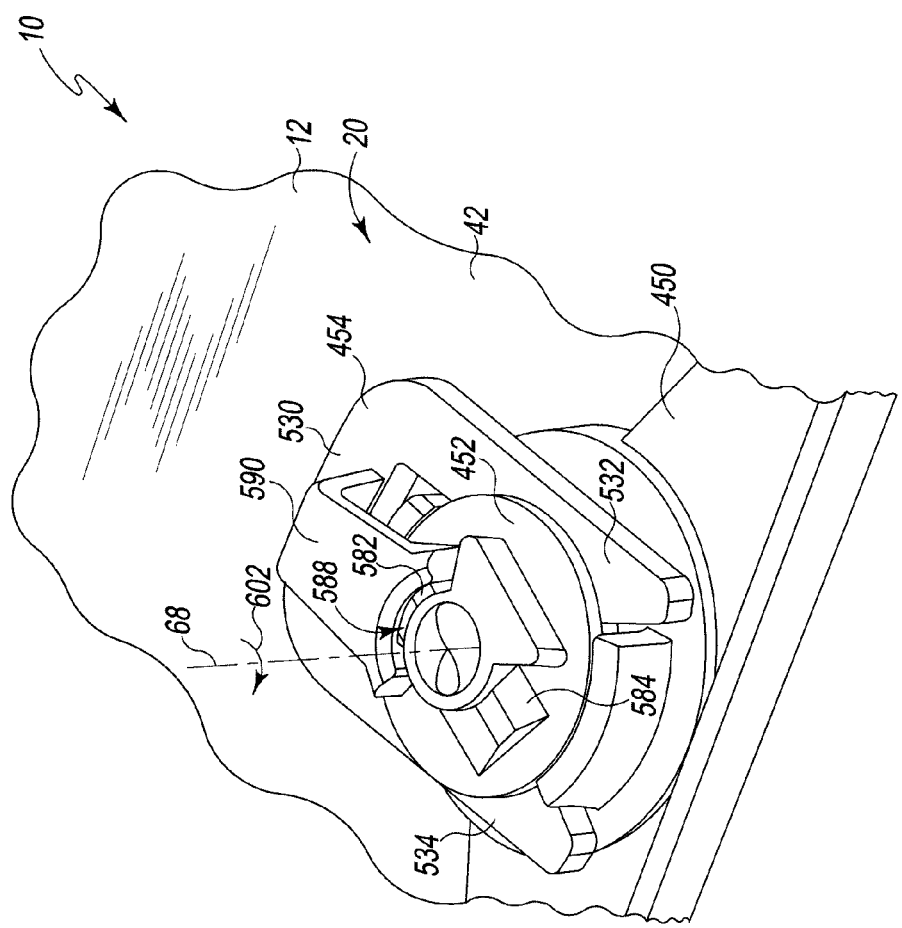
FIG. 8 is a view similar to FIG. 7 showing the cord attachment assembly in a locked position.

Referring now to FIGS. 7 and 8, another embodiment of a cord attachment assembly (hereinafter cord attachment assembly 440) is shown. As shown in FIG. 7, the hand mixer 10 includes an outer casing 12 and a motor (not shown) positioned in a compartment 20 of the casing 12. The hand mixer 10 also includes an electrical cord 30 that is configured to connect the motor to an electrical power supply. The electrical cord 30 is pivotally coupled to the outer casing 12 via the cord attachment assembly 440, as described in greater detail below.

As shown in FIG. 7, the cord attachment assembly 440 includes a platform 450 integrally formed with a bottom wall 42 of the casing 12, a cord guide 452, and a retaining clip 454 that secures the cord guide 452 to the platform 450. The platform 450 includes a base 456 that extends upwardly from the bottom wall 42 of the casing 12, and the base 256 has a substantially planar upper surface 458. The platform 450, like the platforms of the embodiments of FIGS. 1-6, has a passageway (not shown) that extends through an opening defined in the casing 12. As shown in FIGS. 7 and 8, a pivot axis 68 extends through the platform 450.

As shown in FIG. 7, the cord guide 452 of the cord attachment assembly 440 has a portion of the cord 30 extending therethrough. The cord guide 452 includes an outer hub 82 that is positioned outside of the compartment 20 and a guide body 484 that extends upwardly from the outer hub 82 into the passageway defined in the platform 450. The cord guide 452 is configured to swivel or pivot about the axis 68 relative to the casing 12. In that way, the cord guide 452 (and hence the cord 30) may be repositioned to move the cord 30 to a more convenient position and thereby facilitate the mixing operation.

In the illustrative embodiment, the outer hub 82 and the guide body 484 are formed as a single monolithic component from a hard plastic material, such as, for example, polyvinyl chloride ("PVC"). It should be appreciated that in other embodiments the outer hub 82 and the guide body 484 may be formed as a single monolithic component from the same material. It should also be appreciated that the cord guide 452 may include additional components that are formed separately and later assembled into the cord guide 452.

As shown in FIG. 7, the guide body 484 of the cord guide 452 is positioned in the platform 450 when the hand mixer 10 is assembled. The guide body 484 has a cylindrical outer surface 520, and a slot 522 is defined in the guide body 484. When the guide body 484 is properly positioned in the passageway of the platform 450, the slot 522 is positioned above the upper surface 458 of the platform 450.

As described above, the cord attachment assembly 440 also includes a retaining clip 454 that secures the cord guide 452 to the platform 450. In the illustrative embodiment, the retaining clip 454 is formed from an acetal plastic material. It should be appreciated that in other embodiments the retaining clip 454 may be formed from another resilient polymeric or metallic material. The retaining clip 454 of the attachment assembly 440 includes a support beam 530 and a pair of arms 532, 534 that extend outwardly from the support beam.

The cord attachment assembly 440 also includes a locking mechanism 580 operable to lock or retain the cord guide 452 in position about the axis 68. As shown in FIGS. 7 and 8, the locking mechanism 580 includes a pair of tabs 582, 584 that extend upwardly from the upper surface 586 of the cord guide 452.

The locking mechanism 580 also includes the notch 588 defined in the retaining clip 454. As shown in FIGS. 7 and 8, the retaining clip 454 includes an arm 590 that extends from the support beam 530 between the other arms 532, 534. The arm 590 includes a branch 592 that extend upwardly from the support beam 530 and another branch 594 that extend outwardly from an upper end 596 of the branch 592. The notch 588 is defined in a bottom surface 598 of the branch 594 of the arm 590. It should be appreciated that in other embodiments the outer casing may include an inner wall that has the notch defined therein.

The cord guide 452, like the other cord guides described herein, is configured to move between an unlocked position (see FIG. 7) and two locked positions (see FIG. 8). In the unlocked position shown in FIG. 7, the tabs 582, 584 of the locking mechanism 580 are positioned outside of the notch 588 defined in the retaining clip 454, and the cord guide 452 is permitted to pivot about the axis 68 in either direction indicated by arrows 600, 602. To lock the cord guide 452 in one of the locked positions, the cord guide 452 may be pivoted in the direction indicated by arrow 600 so that the tab 582 is advanced into contact with the branch 594 of the arm 590. When the cord guide 452 is advanced further in the direction indicated by arrow 600, the tab 582 may slide along the bottom surface 598 of the arm 590, thereby causing the branch 594 to flex outward and permitting the tab 582 to advance into the notch 588.

As shown in FIG. 8, the engagement between the tab 582 and the notch 588 inhibits rotation of the cord guide 452 about the axis 68 such that the cord guide 452 is retained in the locked position. To release the cord guide 452 from the locked position, a predetermined amount of force may be applied to the cord guide 452 in the direction indicated by arrow 602. When the predetermined amount of force is applied, the branch 594 of the retaining clip 254 flexes outward such that the tab 582 may be advanced out of the notch 588 and into the unlocked position shown in FIG. 7.

To lock the cord guide 452 in the other locked position, the cord guide 452 may be rotated in the direction indicated by arrow 602 to advance the tab 584 into contact with the branch 594 of the arm 590. When the cord guide 452 is advanced further in the direction indicated by arrow 602, the tab 584 may slide along the bottom surface 598 of the arm 590, thereby causing the branch 594 to flex outward and permitting the tab 584 to advance into the notch 588. The engagement between the tab 584 and the notch 588 inhibits rotation of the cord guide 452 about the axis 68 such that the cord guide 452 is retained in the locked position.

While the embodiments described above include two discrete locked positions, it should be appreciated that in the cord attachment assembly may have additional or fewer locked positions. For example, the retaining clip may include additional or fewer notches to receive the tab and secure the cord guide at other positions. Additionally, in other embodiments, the locking mechanism may include additional tabs.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A hand mixer comprising:
an outer casing having a handle secured thereto, wherein the outer casting includes (i) a bottom wall having an opening defined therein, the opening being a first opening, (ii) a platform extending upwardly from the bottom wall, the platform having a second opening defined in an upper end thereof, and (iii) an inner wall extending downwardly from the second opening to the first opening to define a passageway through the platform;
a mixing element extending downwardly from the outer casing, the mixing element being rotatively coupled to a motor positioned in the outer casing;
a cord guide positioned in an opening defined in the outer casing, the cord guide being configured to pivot about a pivot axis, wherein the cord guide includes (i) a sleeve positioned external to the outer casing, and (ii) a guide body extending upwardly from the sleeve into the passageway;
a retaining clip including a pair of arms positioned in a slot defined in the cord guide to couple the cord guide to the outer casing in both a rotating state and a non-rotating state of the cord guide;
an electrical cord extending through the cord guide, the electrical cord being in electrical communication with the motor to supply electrical current thereto; and
a locking mechanism operable to retain the cord guide in a first position about the pivot axis, the locking mechanism including (i) a tab extending from the cord guide, and (ii) a notch defined in one of the retaining clip and the outer casing, the notch being sized to receive the tab.

2. The hand mixer of claim 1, wherein the cord guide includes a guideway having the electrical cord extending therethrough, the guideway has a first section extending through the guide body and a second section extending through the sleeve, and an angle is defined between a first axis defined by the first section and a second axis defined by the second section, the angle having a magnitude of greater than or equal to ninety degrees.

3. The hand mixer of claim 1, wherein: the pivot axis extends through the passageway between the first opening and the second opening, the platform includes a cylindrical shell having a first channel and a second channel defined therein, the first channel and the second channel extending orthogonal to the pivot axis, and the pair of arms of the retaining clip includes a first arm positioned in the first channel and a second arm positioned in the second channel.

4. The hand mixer of claim 3, wherein: the guide body includes a cylindrical surface and a pair of rim surfaces that extend outwardly from the cylindrical surface to define the slot of the cord guide, the tab of the locking mechanism extends outwardly from the cylindrical surface between the pair of rim surfaces, and the first arm of the retaining clip includes an inner surface having a first surface section shaped to match the cylindrical surface of the guide body and a second surface section that defines the notch of the locking mechanism.

5. The hand mixer of claim 4, wherein the tab has a convex outer surface, and the second surface section of the first arm is a concave surface that is shaped to receive the convex outer surface of the tab.

6. The hand mixer of claim 4, wherein: the second arm of the retaining clip includes an inner surface having (i) a first surface section shaped to match the cylindrical surface of the guide body and (ii) a second surface section, and the locking mechanism includes a second notch defined by the second surface section of the second arm, the second notch being sized to receive the tab to retain the cord guide in a second position about the pivot axis.

7. The hand mixer of claim 1, wherein a pair of inner walls extends upwardly from the upper end of the platform, and the notch of the locking mechanism is defined between the pair of inner walls.

8. The hand mixer of claim 7, wherein the guide body includes a cylindrical outer surface having the tab extending radially outward therefrom, and the slot is defined in the cylindrical outer surface below the tab.

9. The hand mixer of claim 8, wherein the locking mechanism includes a second tab extending radially outward from the cylindrical outer surface of the guide body, the second tab being sized to be received in the notch to retain the cord guide in a second position about the pivot axis.

10. The hand mixer of claim 1, wherein the guide body includes an upper surface, the tab extends upwardly from the upper surface, and the notch is defined in a downward-facing surface of one of the retaining clip and the outer casing.

11. The hand mixer of claim 10, wherein the retaining clip includes a third arm having an end positioned above the pair of arms, and the end of the third arm has the notch defined therein.

12. The hand mixer of claim 11, wherein the locking mechanism includes a second tab extending upwardly from the upper surface of the guide body, the second tab being sized to be received in the notch to retain the cord guide in a second position about the pivot axis.

13. A hand mixer comprising:
an outer casing having a handle secured thereto,
a mixing element extending downwardly from the outer casing, the mixing element being rotatively coupled to a motor positioned in the outer casing,
a cord guide positioned in an opening defined in the outer casing, the cord guide being configured to pivot about a pivot axis,
a retaining clip engaged with the cord guide to continuously couple the cord guide to the outer casing, and
an electrical cord extending through the cord guide, the electrical cord being in electrical communication with the motor to supply electrical current thereto, wherein (i) the cord guide includes a body having a tab extending therefrom, and (ii) the retaining clip includes an arm having a notch defined therein, the notch being sized to receive the tab to retain the cord guide in a first position about the pivot axis;
wherein, the body of the cord guide has a slot defined therein, the arm of the retaining clip is a first arm positioned in the slot, and the retaining clip includes a second arm extending substantially parallel to the first arm, the second arm being positioned in the slot opposite the first arm.

14. The hand mixer of claim 13, wherein the second arm has a second notch defined therein, the second notch being sized to receive the tab of the cord guide to retain the cord guide in a second position about the pivot axis.

15. The hand mixer of claim 13, wherein (i) the body of the cord guide has an upper surface, (ii) the tab extends upwardly from the upper surface, and (iii) the notch is defined in a lower surface of the arm of the retaining clip.

16. The hand mixer of claim 15, wherein the body of the cord guide includes a second tab extending upwardly from the upper surface, the second tab being sized to be received in the notch to retain the cord guide in a second position about the pivot axis.

17. A hand mixer comprising:
an outer casing having a handle secured thereto,
a mixing element extending downwardly from the outer casing, the mixing element being rotatively coupled to a motor positioned in the outer casing,
a cord guide positioned in an opening defined in the outer casing, the cord guide being configured to pivot about a pivot axis,
a retaining clip having a pair of arms positioned in a slot of the cord guide to couple the cord guide to the outer casing when moving from a first position to a second position, and
an electrical cord extending through the cord guide, the electrical cord being in electrical communication with the motor to supply electrical current thereto, wherein (i) the cord guide includes a cylindrical body having a tab extending radially outward therefrom, and (ii) the outer casing has a notch defined therein sized to receive the tab to retain the cord guide in the first position about the pivot axis, wherein the cylindrical body has a second tab extending radially outward therefrom, the second tab being sized to be received in the notch to retain the cord guide in the second position about the pivot axis.

* * * * *